United States Patent
Patil et al.

(10) Patent No.: US 12,505,923 B2
(45) Date of Patent: Dec. 23, 2025

(54) SYSTEMS AND METHODS FOR SELF-SENSING MOBILE MEDICAL DEVICES TO AUTO-CORRECT AN OUTPUT

(71) Applicant: KONINKLIJKE PHILIPS N.V., Eindhoven (NL)

(72) Inventors: Ravindra Patil, Bangalore (IN); Meru Adagouda Patil, Bangalore (IN); Sarif Kumar Naik, Bangalore (IN); Sampad Kumar Mohanty, Bangalore (IN); Karthick Raja, Bangalore (IN); Shraddha Barodia, Bangalore (IN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 171 days.

(21) Appl. No.: 18/283,842

(22) PCT Filed: Mar. 25, 2022

(86) PCT No.: PCT/EP2022/058022
§ 371 (c)(1),
(2) Date: Sep. 25, 2023

(87) PCT Pub. No.: WO2022/207516
PCT Pub. Date: Oct. 6, 2022

(65) Prior Publication Data
US 2024/0156439 A1   May 16, 2024

Related U.S. Application Data

(60) Provisional application No. 63/169,272, filed on Apr. 1, 2021.

(51) Int. Cl.
*G16H 40/63* (2018.01)
*A61B 8/00* (2006.01)

(52) U.S. Cl.
CPC ............. *G16H 40/63* (2018.01); *A61B 8/461* (2013.01); *A61B 8/54* (2013.01); *A61B 2560/0252* (2013.01)

(58) Field of Classification Search
CPC ........... A61B 6/545; A61B 8/585; A61B 8/54; A61B 8/546; A61B 8/46; A61B 8/461;
(Continued)

(56) References Cited

U.S. PATENT DOCUMENTS

| 5,904,707 A | 5/1999 | Ochs |
| 2008/0267467 A1 | 10/2008 | Sokulin |

(Continued)

FOREIGN PATENT DOCUMENTS

WO   2020/212470 A1   10/2020

OTHER PUBLICATIONS

International Search Report and Written Opinion Dated Jul. 7, 2022 For International Application No. PCT/EP2022/058022 Filed Mar. 25, 2022.

*Primary Examiner* — Carolyn A Pehlke

(57) ABSTRACT

A medical device (10) includes a medical component (12); at least one environmental sensor (14, 14₁); an electronic processor (20); and a non-transitory computer readable medium (26). The non-transitory computer readable medium (26) stores: device operational instructions executable by the electronic processor (20) to control the medical component to perform a medical function respective to a medical subject; an operating specification (30) for the medical device; and device monitoring instructions executable by the electronic processor (20) to: receive a measurement of at least one environmental parameter from the at least one environmental sensor; and output an alert (32) about the performance of the medical function respective to the medical subject if the measurement of the at least one
(Continued)

environmental parameter is outside of the operating specification for the medical device.

19 Claims, 8 Drawing Sheets

(58) Field of Classification Search
CPC . A61B 8/4427; A61B 8/44; A61B 2560/0242; A61B 6/44; A61B 6/4405; A61B 6/46; A61B 6/461; A61B 6/54; A61B 6/542; A61B 6/586; G16H 40/60; G16H 40/63; G01T 1/02; G01T 1/167; G01T 1/169; G01T 1/178; G01T 1/18
See application file for complete search history.

(56) References Cited

U.S. PATENT DOCUMENTS

| | | |
|---|---|---|
| 2013/0144206 A1 | 6/2013 | Lee |
| 2017/0087371 A1 | 3/2017 | Freeman |
| 2017/0308656 A1 | 10/2017 | Petkov |
| 2018/0197634 A1 | 7/2018 | Sjostedt |
| 2018/0322950 A1* | 11/2018 | Cronin ............... A61B 5/026 |
| 2020/0000430 A1 | 1/2020 | Chamberlain |
| 2020/0015031 A1 | 1/2020 | Mandwal |
| 2021/0060243 A1 | 3/2021 | Dave |

* cited by examiner

SYSTEMS AND METHODS FOR SELF-SENSING MOBILE MEDICAL DEVICES TO AUTO-CORRECT AN OUTPUT

CROSS REFERENCE TO RELATED APPLICATIONS

This application is the U.S. National Phase application under 35 U.S.C. § 371 of International Application No. PCT/EP2022/058022 filed Mar. 25, 2022, which claims the benefit of U.S. Provisional Patent Application No. 63/169,272 filed Apr. 1, 2021. These applications are hereby incorporated by reference herein.

FIELD

The following relates generally to the medical device arts, medical device monitoring arts, medical device environmental monitoring arts, medical device usage arts, and related arts.

BACKGROUND

Mobile medical devices have substantial advantages, in that they can be moved to the patient room rather than requiring the patient to be moved to the medical device. Moving a patient requires one or more hospital attendants to move the patient onto a gurney and transport the patient to the medical device. If the patient is connected with medical equipment (e.g., an intravenous drip, patient monitor, and/or so forth) then these connections need to be removed or handled during the patient move. In addition to being time-consuming and utilizing valuable time of medical professionals, moving a patient can be stressful and potentially hazardous for the patient.

By contrast, a mobile medical device can be moved to the patient, often by a single medical technician, and utilized to perform a medical task at the patient bedside. In view of these benefits, many types of medical devices are available as mobile devices, including electrocardiograph (ECG) machines, ultrasound machines, mobile X-ray devices, patient monitors of various types, and so forth.

The following discloses certain improvements.

SUMMARY

In some embodiments disclosed herein, a medical device includes a medical component; at least one environmental sensor; an electronic processor; and a non-transitory computer readable medium. The non-transitory computer readable medium stores: device operational instructions executable by the electronic processor to control the medical component to perform a medical function respective to a medical subject; an operating specification for the medical device; and device monitoring instructions executable by the electronic processor to: receive a measurement of at least one environmental parameter from the at least one environmental sensor; and output an alert about the performance of the medical function respective to the medical subject if the measurement of the at least one environmental parameter is outside of the operating specification for the medical device.

In some embodiments disclosed herein, a non-transitory computer readable medium stores instructions executable by at least one electronic processor to perform a method of monitoring, with at least one environmental sensor, a performance of a medical device. The method includes: receiving a measurement of at least one environmental parameter from the at least one environmental sensor; determining whether the measurement of the at least one environmental parameter is outside of an operating specification for the medical device; and outputting an alert about the performance of a medical function, respective to a medical subject, performed by a medical component of the medical device when the measurement of the at least one environmental parameter is outside of the operating specification for the medical device.

One advantage resides in determining when a medical device is not operating within an operating specification of the medical device.

Another advantage resides in auto-correcting one or more parameters of a medical device when the one or more parameters are outside of an operating specification of the medical device.

Another advantage resides in outputting an alert when one or more parameters of the medical device are outside of an operating specification of the medical device.

Another advantage resides in providing multiple sensors on a medical device to measure parameters of the device and determining when the measured parameters are outside of an operating specification of the medical device.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

DETAILED DESCRIPTION

Figure 1:
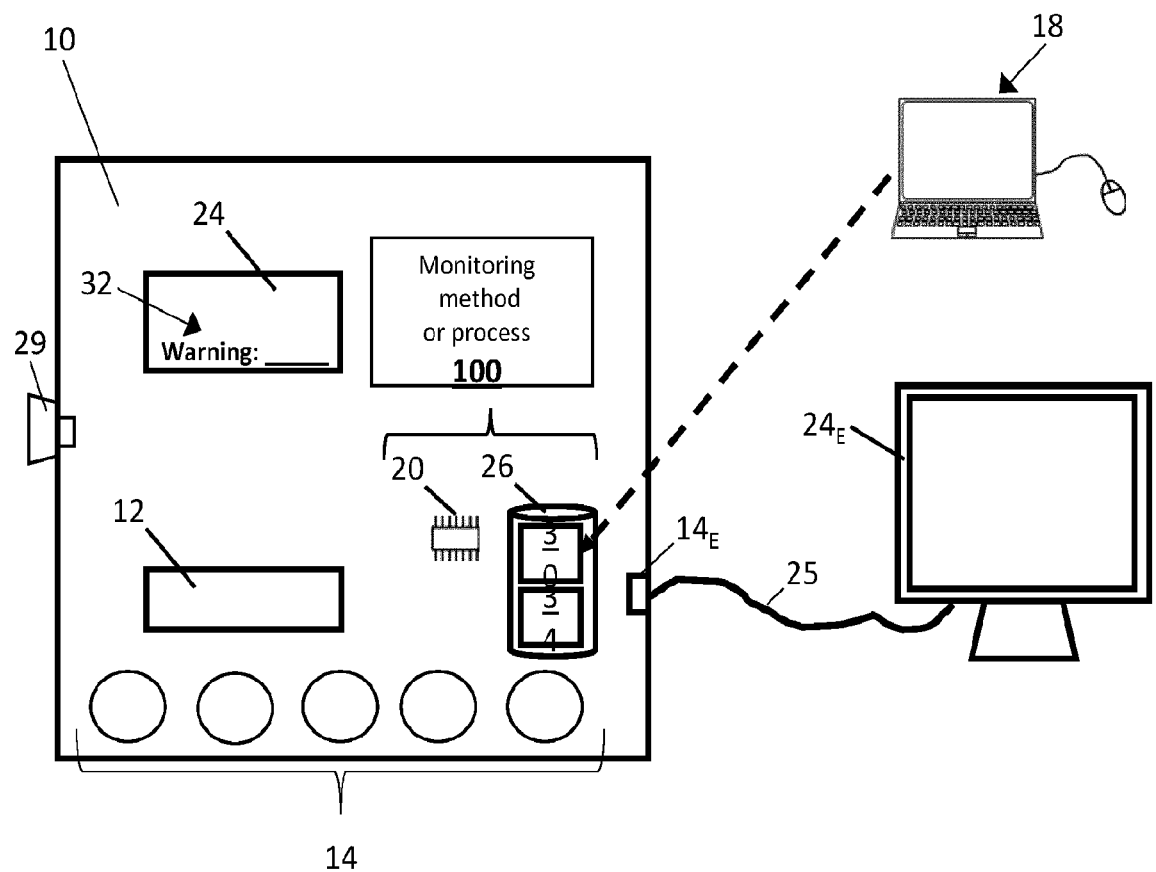
FIG. 1 diagrammatically illustrates a medical device in accordance with the present disclosure.

A challenge recognized herein of mobile medical devices (e.g., ultrasound devices, patient monitors, electrocardiogram (ECG) devices, mobile X-ray devices, and so forth) is that such mobile devices are not used under static environmental conditions or setup like "immobile" devices (e.g., computed tomography (CT) devices, magnetic resonance (MR) devices, and so forth). Mobile devices are used under different and changing environmental conditions such as temperature, air quality, humidity, sunlight, uneven surface conditions, and so forth.

With these different environment conditions, there is possibility that such mobile devices are not operating according to standard operating procedure (SOP) dictated by the manufacturer. Hence, these nonstandard environmental conditions have impact on the output of the mobile devices including, for example, a low-quality output laced with noise, incorrect readings being recorded (i.e., when not operated in correct temperature conditions), inaccurate displaying of images on display devices that are affected by glare, overheating, etc., improper connections between multiple devices, and so forth.

Existing medical devices could be operating outside of its SOP, which is defined by parameters such as an operational temperature range, operational humidity range, a quantitative leveling metric of the device (e.g., no more than 5 degrees from level), and so forth. Even if the device is operating within the SOP, adjustments may be made by the user in response to specific environmental conditions. For example, an ultrasound technician may adjust the contrast, sharpness, and other parameters of the ultrasound images based on ambient lighting conditions or may adjust the volume of the audio speaker when listening to blood flow during a Doppler ultrasound examination. The operation outside of the SOP envelope or with an otherwise-problematic environmental parameter could have various types of impact, such as inaccurate medical data being collected (e.g., ECG traces with excessive noise potentially resulting in clinical reading error), therapy being delivered with non-optimal parameters (e.g., an intravenous infusion delivered at a nonoptimal fluid temperature), increased likelihood of operator error due to misreading the display (in the case of the medical device providing visual output) or misapprehending an audio output of the medical device (e.g., when listening to blood flow during a Doppler ultrasound examination), or so forth. In another example, an operation outside of the SOP can include excessive radiation exposure in mobile devices, such as X-ray imaging devices, mobile C-Arm imaging devices, and so forth.

The following discloses adding one or more environmental sensors to detect whether a medical device is operating outside of its SOP, or under conditions where a non-standard adjustment is commonly made by experienced users (such as adjusting contrast, sharpness, or other image parameters to account for poor lighting conditions). If an environmental issue is detected, then an alert may be issued notifying the user of the out-of-range SOP parameter or problematic environmental condition. Additionally or alternatively, the system may automatically adjust to accommodate for the environmental issue where feasible, e.g., the ultrasound device may automatically adjust image parameters to compensate for poor lighting. On the other hand, in some embodiments, if the environmental issue is sufficiently serious (e.g., significant possibility of leading to an erroneous clinical conclusion, or to delivering clinically unacceptable therapy to the patient) then in these embodiments the medical device may abort (e.g., refuse to perform) the medical operation. Optionally, in the case of an out-of-range SOP parameter, this may be noted in the metadata associated to the image or other collected medical data, and/or in a machine log of the medical device.

The detection of an environmental issue can be done using various approaches such as hard-coded heuristics or thresholding, or using a trained machine learning (ML) component. The former may be useful when the detection is straightforward (for example, determining whether the measured ambient temperature within the SOP operational temperature range). The latter, ML approach, may be preferable for capturing more complex environmental issues that may depend on multiple measured environmental conditions, and/or for designing automatic adjustment to compensate for a detected problematic environmental condition.

As an example of the ML approach, training data can be collected for clinical usage of an ultrasound machine, which includes readings of an ambient light sensor (possibly with directional measurement to assess glare angle) and image settings used by an experienced operator such as contrast and sharpness settings. In other words, one or more image settings or parameters of the image that is displayed are adjusted. A neural network (NN) or other ML component can then be trained to optimally set the image settings in response to lighting conditions detected by the ambient light sensor.

To implement the disclosed approach, relevant information from the SOP of the medical device should be known. In some embodiments, the SOP can be hard-coded into the software or firmware of the ultrasound device or other medical device. However, the SOP may change over time due to addition of optional equipment, use of the medical device for different tasks, changes in hospital procedures or regulatory requirements, or so forth, which would then require a software or firmware update to account for the changed SOP. In another approach, the SOP is loaded into a memory of the medical device in a machine-readable format, e.g., as a table or other data structure that is formatted to be read by the software or firmware of the medical device. This allows for updating the data structure without updating the underlying software or firmware. In yet another approach, the SOP stored in the medical device is automatically derived from the operating manual or other natural language documentation of the medical device which contains the SOP. Hence, in these embodiments keyword searching, natural language processing (NLP), and/or other techniques are used to extract the SOP from the latest version of the operating manual.

With reference to FIG. 1, an illustrative medical device 10 is shown diagrammatically as a rectangular box. The medical device 10 can be, for example, a medical imaging device, a medical probe, a medical monitor, a medical therapy delivery device (e.g., an IV pump), a medical measurement device, or any other suitable medical device. Typically, although not necessarily, the medical device 10 is a mobile medical device, for example mounted on a cart with rollers (or other suitable moving devices, such as hovering devices or chain-based movement devices) so as to be moved between hospital rooms, laboratories, or other locations, including outside a hospital setup (e.g., a sports medicine facility, and so forth). As such, the medical device 10 may be used under different environmental conditions depending on which hospital room, laboratory, or other location it is used. The medical device 10 typically also includes a display 24 via which a user interface is provided, and/or via which clinical information is provided. Additionally or alternatively, the medical device 10 may be connected to an external monitor $24_E$ via an HDMI cable or other display cable 25 (or in another example, can be connected wirelessly). For example, if the medical device 10 is a mobile ultrasound machine then the display 24, $24_E$ may present ultrasound images. (In some image-intensive devices such as an ultrasound machine, two displays 24 may be provided—one for presenting medical images, and the other providing softkeys, displaying operational messages, or other user interfacing actions). In some designs, visual output may additionally or alternatively be provided by light emitting diodes (LEDs) or the like (not shown). Some mobile medical devices such as a Doppler ultrasound machine may also include a loudspeaker 29 for providing audible output.

The medical device 10 also includes one or more medical components 12 (diagrammatically as a rectangular box within the rectangular box representing the medical device 10) for performing a medical function, such as ultrasound imaging, delivery of an intravenous infusion, reading patient vital sign sensors, or so forth. The type of medical component 12 can correspond to the type of the medical device 10. For example, the medical component 12 can be a medical imaging component when the medical device 10 is a medical imaging device, such as a Doppler ultrasound measurement component when the medical device 10 is an ultrasound device, or radiation detectors if the medical device 10 is an imaging device, such as a C-arm, mobile imaging device or an X-ray imaging device.). In the case of a Doppler ultrasound device, the Doppler ultrasound medical component 12 may also acquire blood flow measurements and present the blood flow audibly via the loudspeaker 29. These are merely illustrative examples and should not be construed as limiting; it will be appreciated that the medical component 12 can be any suitable medical component of a medical device 10.

The medical device 10 also includes at least one environmental sensor 14 disposed or operatively connected to a portion thereof. Multiple environmental sensors 14 are diagrammatically shown in FIG. 1 as circles disposed in the box depicting the medical device 10. The at least one environmental sensor 14 is configured to measure and record a measurement of at least one environmental parameter. In some embodiments, the at least one environmental sensor 14 may include an optional display connector $14_E$ via which the external display $24_E$ is connected, insofar as the display connector $14_E$ detects signals indicating information about the particular external display $24_E$ that is connected. In another example, the at least one environmental sensor 14 can be disposed directly on the external display $24_E$, such as in cases of ambient light or glare.

The medical device 10 further includes an electronic processor 20 is operatively connected with one or more non-transitory storage media 26. The non-transitory storage media 26 may, by way of non-limiting illustrative example, include one or more of a magnetic disk or other magnetic storage medium; a solid-state drive, flash memory, or other electronic memory; an optical disk or other optical storage; various combinations thereof; or so forth. It is to be understood that any reference to a non-transitory medium or media 26 herein is to be broadly construed as encompassing a single medium or multiple media of the same or different types. Likewise, the electronic processor 20 may be embodied as a single electronic processor or as two or more electronic processors. The non-transitory storage media 26 stores instructions executable by the at least one electronic processor 20. The instructions may, for example, include instructions to generate a visualization of a device operating graphical user interface (GUI) for display on the display device 24.

The non-transitory computer readable medium 26 is further configured to store an operating specification 30 for the medical device 10. In some examples, the operating specification 30 can be stored as hard-coded parameters of software or firmware of the medical device 10. In other examples, the operating specification 30 can be stored as a table or other machine-readable data structure that is accessed by software or firmware of the medical device. In one embodiment, an electronic manual (e.g., a PDF or other suitable document format) is mined by a computer or other electronic processing device 18 to extract the machine-readable operating specification 30 which is then transmitted to the medical device 10 (e.g., via a USB cable or other wired data transmission cable, or via Wi-Fi or another wireless communication protocol) and stored in the non-transitory computer readable medium 26 of the medical device 10. An electronic processor of the electronic processing device 18 performs a natural language processing (NLP) process on the electronic manual to extract the operating specification 30 for the medical device from the electronic manual. The extracted operating specification 30 can then be stored on the non-transitory storage medium 26 of the medical device 10.

The non-transitory computer readable medium 26 is configured to store device operational instructions executable by the electronic processor 20 of the medical device 10 to control the medical component 12 to perform a medical function respective to a medical subject. The device operational instructions can include instructions to perform any suitable medical function that can be performed by the particular medical device 10, such as, for the example of the medical device 10 being a portable ultrasound machine, acquiring a medical image (here, an ultrasound image) of the subject and presenting a rendering of the medical image on the display device 24 or $24_E$, acquiring blood flow measurements of the subject and presenting a sound indicative of the blood flow measurements via the loudspeaker 29, and so forth. As another example, if the medical device 10 is a portable ECG then the device operational instructions can include instructions to read electrical potentials of the ECG leads and display ECG traces, and optionally ECG parameters extracted from those traces, on the display 24 or $24_E$. As another example, if the medical device 10 is a multi-function patient monitor then the device operational instructions can include instructions to read vital sign sensors and display patient vital signs on the display 24 or $24_E$. These are merely illustrative examples and should not be construed as limiting.

The non-transitory computer readable medium 26 is configured to store device monitoring instructions executable by the electronic processor 20 to output one or more alerts 32 (such as an illustrative textual alert 32 diagrammatically indicated on the display 24, which may optionally be in a distinctive, e.g., red, font and/or flashing or otherwise highlighted) related to an environmental parameter that may adversely impact performance of the medical function. To do so, the electronic processor 20 is configured to receive the measurement of at least one environmental parameter from the at least one environmental sensor 14, $14_E$. The environmental sensor 14 can include, for example, an optical sensor, a microphone, a vibration sensor (e.g., an accelerometer), a hygrometer, a thermometer, a Geiger counter, a gyroscope, or so forth. In some embodiments, the environmental sensor can be the optional display connector $14_E$ for connecting the external display device $24_E$ with the medical device 10. These are merely illustrative examples and should not be construed as limiting.

Once the at least one environmental parameter is received, the device monitoring instructions executable by the electronic processor 20 are configured to detect whether the measurement of the at least one environmental parameter is outside of the operating specification 30 for the medical device 10. In some embodiments, this detecting process can be performed using a thresholding process, in which the at least one environmental parameter is compared to threshold values (which can be stored in the non-transitory computer readable medium 26). In other embodiments, the detecting process can be performed with a trained machine-learning (ML) component 34 implemented in the electronic processor 20. The at least one environmental parameter is input to the ML component 34 to perform the detecting process. The ML component 34 can be trained with data collected from the medical device 10 related to the operating parameters.

If the measurement of the at least one environmental parameter is determined to be outside of the operating specification 30 for the medical device 10, then the medical device 10 is configured to output an alert 32 about the performance of the medical function respective to the medical subject. The alert 32, for example, can be a visual alert (i.e., words, colors, and so forth) displayed on the display device 24, as shown, and/or can be an audio alert output by a loudspeaker 29 of the medical device 10, lighting up an LED indicator, or any other suitable alert.

In a contemplated variant embodiment, if the environmental parameter determined to be outside of the operating specification 30 for the medical device 10 may cause the medical operation to be unsafe or in error, e.g., producing an inaccurate clinical measurement of the patient or delivering a possibly unsafe therapy to the patient, then in addition to or instead of issuing the alert the medical device 10 may abort (e.g., refuse to perform) the medical operation.

In some embodiments, the performance of the medical function respective to the medical subject includes setting an operating parameter of the medical device 10 based on a manual adjustment input received from a user of the medical device 10. The device monitoring instructions can then include modifying the performance of the medical function respective to the medical subject if the measurement of the at least one environmental parameter is outside of the operating specification 30 for the medical device 10. The modification(s) can include automatically adjusting the operating parameter of the medical device based on the measurement of the at least one environmental parameter, ceasing operation of the medical function, and so forth.

Several embodiments of the device monitoring instructions are described herein. These are merely illustrative embodiments and should not be construed as limiting.

In one embodiment, the medical device 10 is a medical imaging device, and the at least one medical component 12 includes a medical imaging component. The environmental sensor(s) 14 include at least one optical sensor. The performance of the medical function respective to the medical subject comprises acquiring a medical image of the subject and presenting a rendering of the medical image on the display device 24 (or, alternatively, an external display 24$_E$). The device monitoring instructions can include receiving the measurement of the environmental parameter that include an ambient light measurement from the optical sensor 14. The ambient light measurement can include a measurement of glare from the display device 24, or a brightness setting, or any other suitable measurement. One or more rendering parameters (e.g., image contrast, image sharpness, and so forth) of the presented rendering of the medical image on the display device 24 can be modified if the ambient light measurement is outside of an ambient light specification of the operating specification 30 for the medical device 10. To modify the rendering parameters, the trained ML component 34 can be applied to inputs including a standard rendering of the medical image and the ambient light measurement to determine the modified rendering parameters.

In another embodiment, the medical device 10 is an ultrasound measurement device (e.g., a Doppler device), the medical component(s) 12 includes a Doppler ultrasound measurement component, and the environmental sensor(s) 14 includes a microphone. The performance of the medical function respective to the medical subject comprises acquiring blood flow measurements of the subject and presenting a sound indicative of the blood flow measurements using the loudspeaker 29. The device monitoring instructions including receiving the measurement comprising an ambient sound measurement from the microphone 14. A volume of the presented sound indicative of the blood flow measurements can be increased if the ambient sound measurement exceeds a maximum ambient sound limit of the operating specification 30 for the medical device 10. In some examples, noise cancellation techniques can be applied to remove ambient noise.

In another embodiment, the environmental sensor(s) 14 includes a vibration sensor (e.g., an accelerometer). The device monitoring instructions can include receiving the measurement comprising a vibration measurement from the vibration sensor 14. The alert 32 can be output if the vibration measurement exceeds a maximum vibration limit of the operating specification 30 for the medical device 10.

In another embodiment, the environmental sensor(s) 14 includes a hygrometer. The device monitoring instructions can include receiving the measurement comprising a humidity measurement from the hygrometer 14. The alert 32 can be output if the humidity measurement exceeds an operational humidity range of the operating specification 30 for the medical device 10.

In another embodiment, the environmental sensor(s) 14 includes a thermometer. The device monitoring instructions can include receiving the measurement comprising a temperature measurement from the thermometer 14. The alert 32 can be output if the temperature measurement is outside of an operational temperature range of the operating specification 30 for the medical device 10.

In another embodiment, the environmental sensor(s) 14 includes a Geiger counter. The device monitoring instructions can include receiving the measurement comprising an ionizing radiation counts from the thermometer 14. The alert 32 can be output if the ionizing radiation counts measurement exceeds a maximum ionizing radiation counts limit of the operating specification 30 for the medical device 10.

In another example in which the environmental sensor(s) 14 includes a Geiger counter, the medical component(s) 12 includes one or more radiation detectors 12. The medical device 10 comprises a medical imaging device (e.g., a nuclear medical imaging device, such as C-arm medical imaging devices, X-ray imaging devices, and so forth), or another medical device that includes radiation detectors 12. The performance of the medical function respective to the medical subject comprises measuring ionizing radiation counts emitted by a radiopharmaceutical administered to the medical subject using the radiation detector 12. The Geiger counter 14 likely requires a heavy lead shield (not shown) between it and the patient, otherwise it would simply measure counts emitted by the patient. The device monitoring instructions can include receiving the measurement comprising an ionizing radiation counts measurement from the Geiger counter 14. The alert 32 can be output if the ionizing radiation counts measurement exceeds a maximum ionizing radiation counts limit of the operating specification 30 for the medical device 10.

In another embodiment, the environmental sensor(s) 14 includes a gyroscope. The device monitoring instructions can include receiving the measurement of tilt of the medical device 10 from the gyroscope 14. The alert 32 can be output if the measurement of tilt exceeds a device tilt limit of the operating specification 30 for the medical device 10.

In another embodiment, the environmental sensor(s) 14 includes an electromagnetic (EM) wave sensor or an eddy currents sensor. The device monitoring instructions can include receiving the measurement of electrical activity of the medical device 10 (e.g., an ECG device or an EEG device) from the EM wave sensor 14. The alert 32 can be output if the measurement of electrical activity exceeds an electrical activity threshold of the operating specification 30 for the medical device 10.

In another embodiment, the medical device 10 is a medical imaging device, and the at least one medical component 12 includes a medical imaging component. The environmental sensor(s) 14 includes the optional display connector 14$_E$ for connecting the external display device 24$_E$ with the medical device 10. The device operational instructions include controlling the medical imaging component 12 to acquire a medical image of the medical subject, and to present a rendering of the medical image on the display device 24 connected with the display connector 14. The device monitoring instructions include receiving the measurement comprising a measurement of display characteristics of the display device 24 connected with the display connector. One or more rendering parameters of the rendering of the medical image on the display device 24 can be automatically modified based on the display characteristics of the display device 24 connected with the display connector 14.

Any of these embodiments described herein can be combined in any suitable manner. For example, in embodiments, where the medical device 10 is a medical imaging device and the environmental sensor(s) 14 include the optical sensor and/or the Geiger counter, any other suitable environmental sensor 14 can include, for example, one or more of the vibration sensor, the hygrometer, the thermometer, and/or the gyroscope.

The medical device 10 is configured as described above to perform a method or process 100 of monitoring a component 12 of the medical device 10. The non-transitory storage medium 26 stores instructions which are readable and executable by the at least one electronic processor 20 to perform disclosed operations including performing the monitoring method or process 100. In some examples, the method 100 may be performed at least in part by cloud processing.

Figure 2:
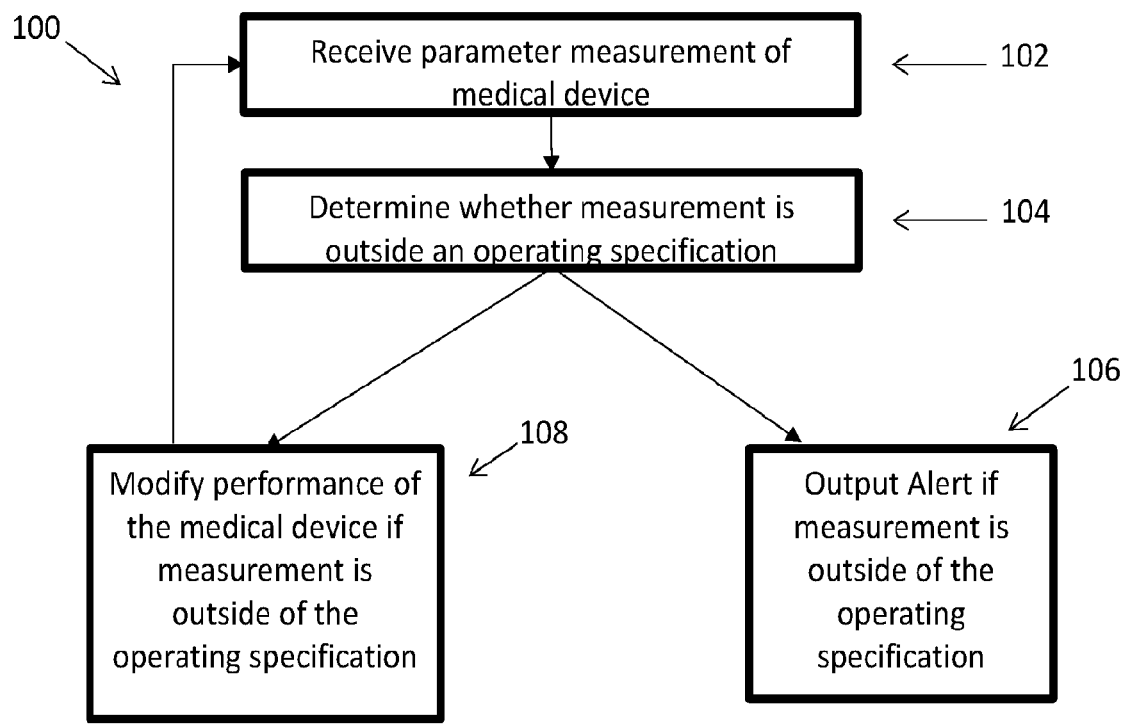
FIG. 2 diagrammatically illustrates a monitoring method of the medical device of FIG. 1.

With reference to FIG. 2, an illustrative embodiment of an instance of the monitoring method 100 is diagrammatically shown as a flowchart. At an operation 102, a measurement of at least one environmental parameter is received from the at least one environmental sensor 14. At an operation 104, the medical device 10 is configured to determine whether the measurement of the at least one environmental parameter is outside of the operating specification 30 for the medical device 10. In some examples, multiple measurements of environmental parameters are measured by a number of corresponding environmental sensors 14. The measurements are input to the ML component 34 to determine whether the measurements of the environmental parameters are outside of the operating specification 30 for the medical device 10. At an operation 106, the alert 32 about the performance of a medical function, respective to a medical subject, performed by a medical component 12 of the medical device 10, when the measurement of the at least one environmental parameter is outside of the operating specification 30 for the medical device 10. At an operation 108, the performance of the medical function respective to the medical subject can be modified if the measurement of the at least one environmental parameter is outside of the operating specification 30 for the medical device 10. The modification can include automatically adjusting the operating parameter of the medical device 10 based on the measurement of the at least one environmental parameter. The method 100 can then be completed until the measured environmental parameter is within limits of the operation specification 30.

EXAMPLE

The following describes in more detail operation of the environmental sensor(s) 14 and the method 100. The environmental sensor(s) 14 are configured to sense surrounding environmental conditions, such as temperature, humidity, electrical noise, light, vibration, etc. The environmental sensor(s) 14 can include for example, a temperature monitor (e.g., a thermometer or infrared (IR) sensors), a hydrometer, a thermal noise sensor, a photometer/ambient light sensor, a vibration sensor (e.g., accelerometer), a microphone, a gyroscope, proximity sensors, a Geiger counter, and so forth.

Figure 3:
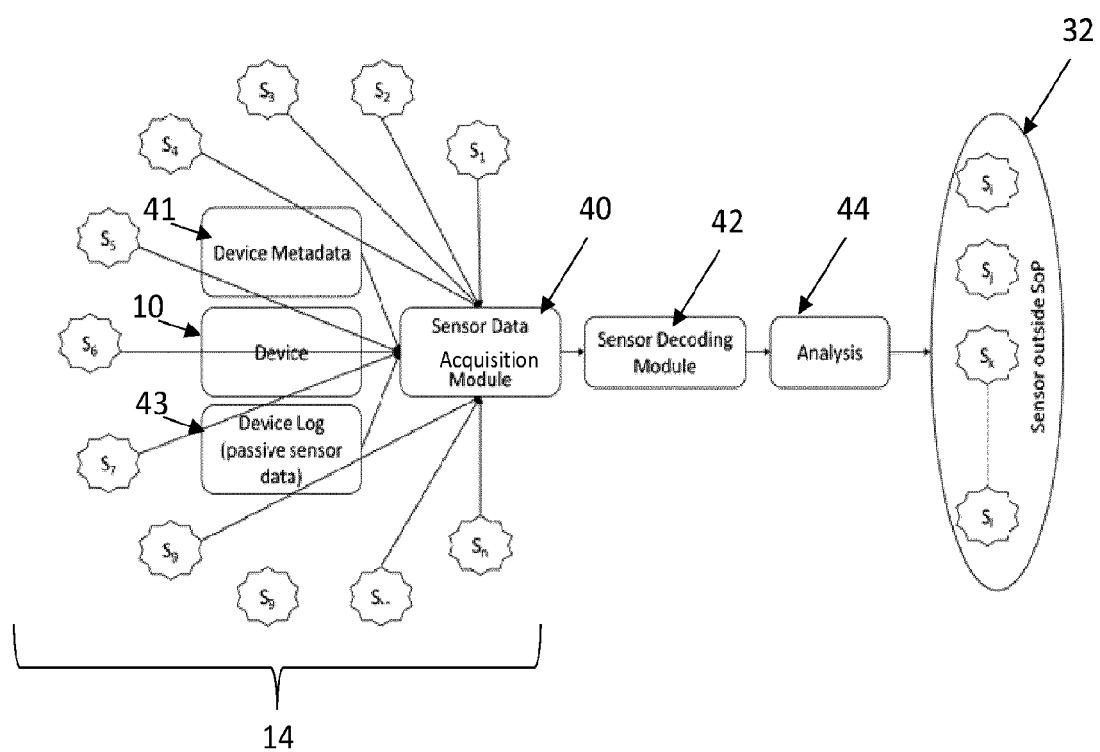
FIGS. 3-8 show examples of different modules and processes implemented in the medical device of FIG. 1.

FIG. 3 shows another example of the device 10, which shows modules of the at least one electronic processor 20 to perform the method 100. The at least one electronic processor 20 includes an acquisition module 40 configured to receive the measurements from the environmental sensors 14, from device metadata 41, and/or a device log 43 (retrieved using extract, transform, load (ETL) processes). The acquisition module 40 is configured to minimize losses while collecting the measurements from the environmental sensor(s) 14. Losses may happen at any stage of data acquisition, though primarily it is attributed to the sampling and conditioning of the signals. The acquired data of noisy electrical impulses are conditioned and converted to digital signals on which analytics can be performed. The acquisition module 40 can also include a sampling rate of the sensor data, and a memory of such a process.

A sensor decoding module 42 is configured to decode a meaning of the measurements. A level of aggregation of the sensor data can be selected to aggregate the sensor data over certain time windows (e.g., fixed time windows, variable time windows, exponentially explaining or exponentially contrasting time, windows, overlapping time windows, and so forth). The aggregations are performed driven by context and the datatypes. For numerical data, aggregation such as median, maximum, and/or mean can be used. For categorical data, aggregation functions like mode, maximum, minimum, and so forth can be used. Missing data can also be compensated for without changing a distribution of the data.

An analysis module 44 is programmed to analyze the measurements to determine if the medical if the medical device 10 is operating with limits of the operating specification 30. To do so, the analysis module 44 can include one or more algorithms or processes, such as an agent-action process in which an action is recommended based on a type of agent of the process. In one example, when the agent is an algorithm, a corresponding action can be issuing the alert 32 to a user regarding the environmental condition or the device conditions (e.g., an IR sensor 14 attached to the medical device 10 picks up the ambient temperature as 37° C., while the medical device 10 is configured to work under 35° C. In another example, the agent can be a threshold-based model which outputs the alert 32 when the medical device 10 is outside of limits of the operating specification 30, such as when an ambient temperature is above 35° C. The action can be to output the alert 32 as an error message on the display device 24 asking a user to regulate the airflow of a room where the medical device 10 is located to maintain room temperature below 35° C. for optimum operation of medical device 10. If there are no configuration available for parts, then statistical method-based agents can be used to output the alerts 32 for the environmental conditions. For example, the agent can include a model that outputs an alert 32 when the current ambient threshold is found above a dynamic threshold (e.g., a mean of thirty past temperature values in addition to a three-degree standard deviation of past temperature values). The action can be to output the alert 32 as an error message on the display device 24 describing the sudden increase in the ambient temperature.

An agent can also be built using a complex machine-learning (ML) algorithm to determine the medical device 10 is working with the operating specification 30. A ML agent can be preferred over a normal threshold-based agent because understanding the variation in the environment can be stochastic. For example, to identify a jerk in the movement of the medical device 10, the environmental sensor 14 can be a gyroscope, but the gyroscope may be too sensitive, which can result in producing a "jerk-like signal" whenever the height of the medical device 10 is adjusted. This may create more false positives for the models if thresholds are used. A table of the type of features for building the ML models are shown below in Table 1.

TABLE 1

| Type of feature | Feature |
|---|---|
| Basic features | Change over time |
| | Rate of change over time |
| | Growth/decay |
| | Rate of growth |
| | Count of values above/below $\epsilon$ |
| | Moving average |
| | Moving standard deviation |
| | Relative average |
| | Relative standard deviation |
| | Ratio of changes, growth rates |
| Feature based on relationship | Error series from machine learning models |
| Features of higher order statistics | Kurtosis |
| | Skewness |
| | Moments and cumulates |
| Features of outlier detection | 3 $\sigma$ values |
| | Kalmann filters |
| | Cluster distances |
| Features based on transformations | Wavelet transformations |
| | Fast Fourier transformations |

Figure 4:
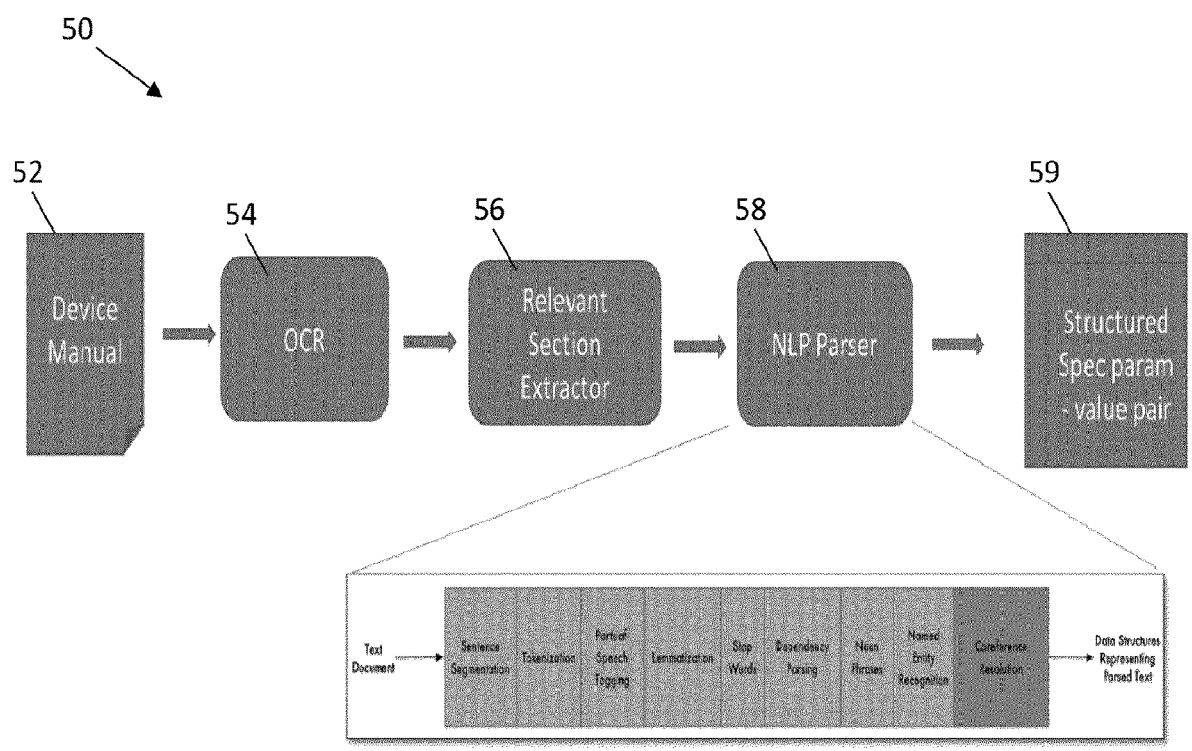

FIG. 4 shows a process of producing the operating specification 30. This information is available in the form of configuration files, machine manuals and general machine setup documents. Though simpler information may be available with the configuration itself, the information like threshold for physical quantities might be available in the log files of the medical device 10. Techniques like Named Entity Recognition can be used for retrieval of information from the configuration files, manual and other manuscripts. To retrieve information from the logs, a content extractor 50 implemented in the at least one electronic processor 20 and is employed with Regular Expression can be used for identifying specific logs that may contain useful information regarding the threshold. This is prominent for information regarding temperature, voltage, and other physical quantities specific to parts of the medical device 10 for which attention is needed. However, the SOP parameters are typically mentioned in the operating manual in most medical devices 10, hence the content extractor 50 is configured to identify the right parameters. The content extractor 50 works on generating parameters and value pair by automatically extracting details from a device manual 52.

The content extractor 50 is configured to intake formatted device manual documents 52 (e.g., PDF, HTML, etc.) as input. These documents 52 are processed by Optical Character Recognition (OCR) module 54. The OCR module 54 is configured to extract content into a machine-readable format. The output of the OCR module 54 is processed by a relevant section extractor module 56. The relevant section extractor module 56 is configured to use a trained ML model that classifies input content as SOP content or not. The training of the ML model is based on set of wording, sentences and values that are closely related to SOP sections of the documents 52. The output of the relevant section extractor module 56 is SOP relevant text. This relevant text is fed to an NLP parser module 58 configured to extract only parameters and corresponding values and output is given in structured format, such as a structured specification parameter-value pair 59. The NLP parser module 58 can perform suitable NLP processes, including for example sentence segmentation, tokenization, part-of-speech toggling, lemmatization, stop words, dependency parsing noun phrases, named entity recognition, and co-reference resolution.

Figure 5:
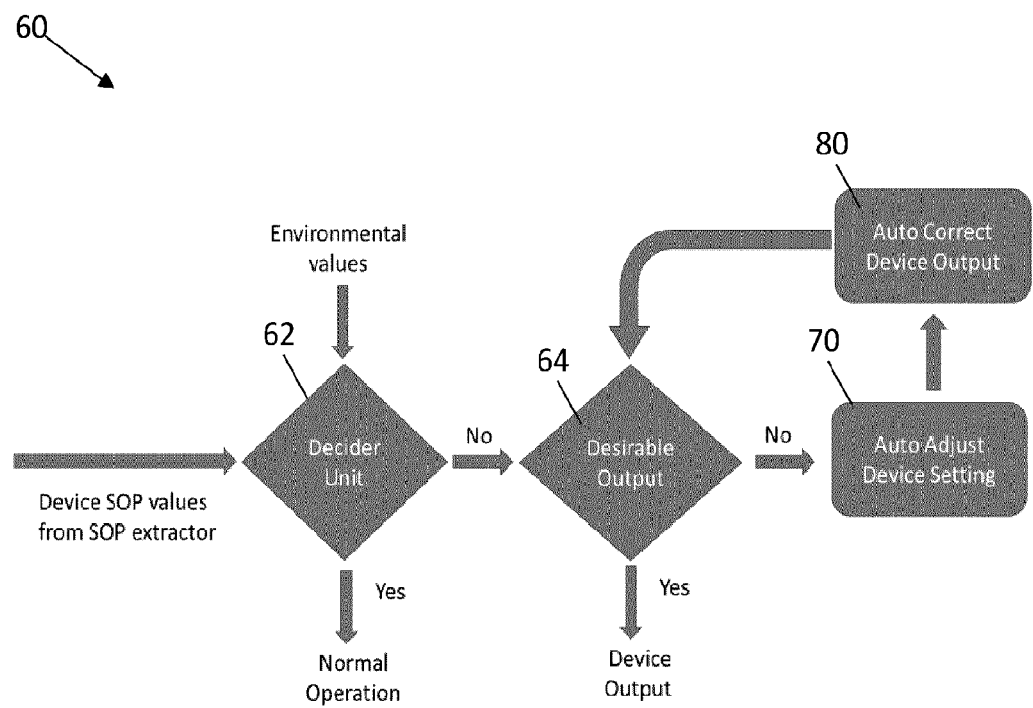

FIG. 5 shows an example of a SOP detector module 60 implemented in the at least one electronic processor 20. Inputs to the SOP detector module 60 can include data from the measurement(s) from the environmental sensor(s) 14 and SOP data from the content extractor 50 (i.e., values including range of temperature, and so forth). These data are input to a decider unit 62 of the SOP detector module 60. The decider unit 62 is configured to use a weighted average based threshold methodology according to Equation 1 to check if current environmental conditions are suitable for the medical device 10 to function or not.

$$\text{Decider Unit} = \begin{cases} \sum_{i=1}^{n} w_i E_i - S_i < T_h & \text{Normal Operation} \\ \sum_{i=1}^{n} w_i E_i - S_i \geq T_h & \text{Stage II Steps} \end{cases} \quad (1)$$

If the decider unit 62 finds that the medical device 10 is proper environment, then no further action is carried out. If the decider unit 62 finds that values are above threshold limit, then further processing is done. A desirable output module 64 is configured to that use an ML classification methodology to check if the output (e.g., image display, voltage/current to system, clinical parameters, etc.) is desirable or not. If output is not desirable, then further processing (described below) is performed including adjusting the device parameters, correct an output to meet changed environment or output an alert 30 if environment is too bad to use the medical device 10 in current situation.

Training for the desirable output module 64 is carried out at a manufacturer level by simulating different environment conditions, different system settings and different output values. The output is validated for its correctness. A single class classifier (like single class SVM) is used to classify only good outputs and the remaining outputs are classified as bad outputs. A typical training data for this classifier is as shown in Table 2.

TABLE 2

| Feature 1 | Feature 2 | Feature 3 | Feature 4 | Feature 5 | ... | Feature ... N | Label |
|---|---|---|---|---|---|---|---|
| Ideal Temp | Ideal Humidity | Ideal Voltage | Ideal Lumin | Ideal Current | Ideal air flow | ...... | Image1 |
| Ideal | Ideal | Ideal | Ideal | Ideal | No air | ...... | Image2 |

TABLE 2-continued

| Feature 1 | Feature 2 | Feature 3 | Feature 4 | Feature 5 | ... | Feature N | Label |
|---|---|---|---|---|---|---|---|
| Temp Low | Humidity Ideal | Voltage Ideal | Lumin Ideal | Current Ideal | flow Ideal air | ...... | Image3 |
| Temp 1 Ideal | Humidity Zero | Voltage Ideal | Lumin Ideal | Current Ideal | flow No air | ...... | Image4 |
| Temp Ideal | Humidity Ideal | Voltage Low | Lumin Ideal | Current Ideal | flow Ideal air | ...... | Voltage |
| Temp Ideal | Humidity Ideal | Voltage Ideal | Lumin Ideal | Current High | flow Ideal air | ...... | Current |
| Temp | Humidity | Voltage | Lumin | Current | flow | | |
| ... | ... | ... | ... | ... | ... | ...... | ... |
| ... | ... | ... | ... | ... | ... | ...... | ... |

The good outputs from the desirable output module 64 are input to the medical device 10, while the bad outputs are input to an auto-adjust device setting module 70. For a medical device 10 with a parameter P (e.g., temperature, humidity, inclination, etc.) measured using the by an environmental sensor 14 (e.g., P1), while an ideal operating parameter in the operating specification 30 can be designated as P2. The difference between the Ideal and actual parameter can be indicated using $\Delta = P1 - P2$. The medical device 10 must compensate for $\Delta$ to achieve an ideal operating environment.

Figure 6:
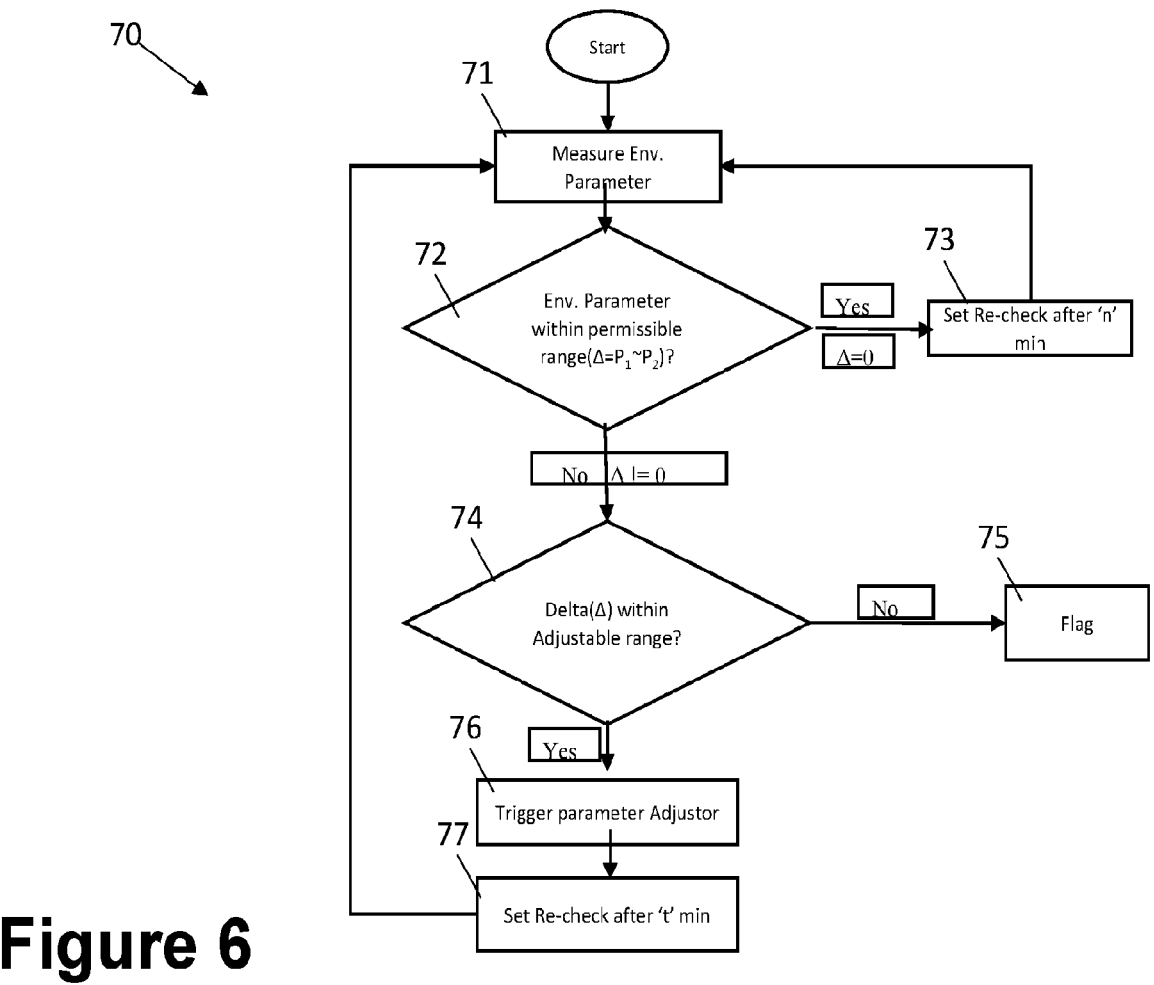

FIG. 6 shows a flow chart depicting operations of the auto-adjust device setting module 70. At an operation 71, an environmental parameter is measured. At an operation 72, a determination is made whether the environmental parameter is within a permissible range (e.g., is $\Delta$ minimized). If yes, then at an operation 73, a re-check of this determination is set for "n" minutes, and the operation 71 is repeated. If not, then at an operation 74, a determination is made as to whether $\Delta$ is within an adjustable range. If no, then an alert 32 or flag is output at an operation 75. If yes, then at an operation 76, a parameter adjustor is triggered. At an operation 77, a re-check is set for a predetermined time (e.g., "t" minutes), and the process 71 is repeated.

Referring back to FIG. 5, outputs from the auto-adjust device setting module 70 are input to an auto-correct device output module 80. The auto-correct device output module 80 includes a ML algorithm to calculate a reading from environmental measurements (e.g., temperature, humidity, pressure, ambient light, etc.). Then the parameters can be adjusted by the auto-correct device output module 80 to minimize $\Delta$. As a result, the medical device 10 should be operating optimally. Outputs from the auto-correct device output module 80 are input to the desirable output module 64, and the processed is repeated, as necessary.

Figure 7:
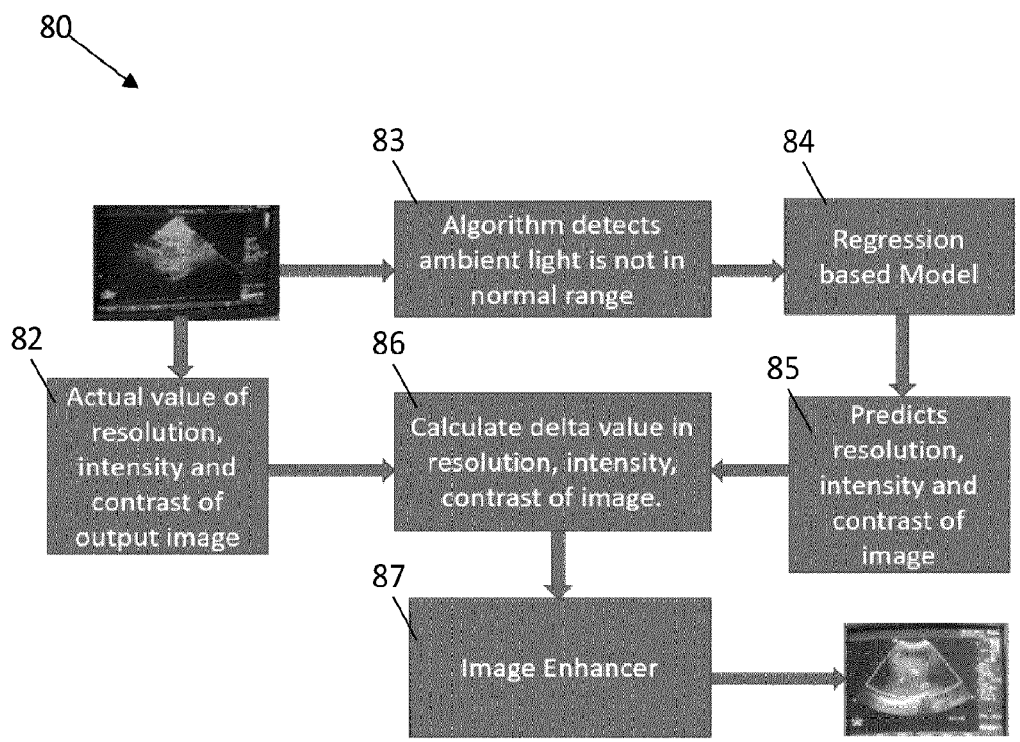

In a first example, the medical device 10 comprises an ultrasound device that is operating in specific temperature, humidity, ambient light, etc., parameters. If the ultrasound device 10 is moved to a darker room, the ambient light for the ultrasound device 10 does not match with normal range. Here, the ultrasound device 10 produces output images of different resolution and contrast as expected. These images can be difficult to interpret for diagnosis. Here, an algorithm shown in FIG. 7 can detect that the ultrasound device 10 is not working in standard environmental condition. At an operation 82, the environmental sensor(s) 14 can measure actual values of the resolution, intensity, and contrast of the images. At an operation 83, the auto-correct device output module 80 is configured to detect the ambient light is not in normal range. At an operation 84, a regression-based algorithm is used to calculate the contrast, intensity, and resolution of the images from an external parameter, such as ambient light. At an operation 85, a predicted resolution, intensity, and contrast values are generated. At an operation 86, $\Delta$ is calculated which is the difference of the actual values and the predicted values. At an operation 87, $\Delta$ is passed to image enhancer to change the device output by auto-correcting (i.e., auto-increment or auto-decrement) the contrast, intensity, and resolution of the images.

In this example, a linear regression or polynomial regression can be used based on the complexity of the relationship between input and output. The output (Y) can include an image resolution/contrast/intensity value, which depends on an input (denoted by X). The equation for linear regression is given as Equation 2:

$$Y = W*X + b \tag{2}$$

where W and b represent weight co-efficient vector and bias, respectively. W and b can be calculated by an Ordinary Least Square (OLS) process, which predicts that the residual error should be minimized. The error and cost function of the equation is given as Equations 3 and 4:

$$\text{Error} = \sum_{i=1}^{n} (\text{actual output} - \text{predicted output}) * 2 \tag{3}$$

$$\text{Cost Function}, J(\theta) = \frac{1}{2} * \sum_{i=1}^{m} (h_\theta((x)^i) - (y)^i)^2 \tag{4}$$

By minimizing the cost function, the co-efficient weight vector W can be determined. The equation of nonlinear polynomial equation is given as Equation 5:

$$Y = \theta_0 + \theta_1 X + \theta_2 X^2 + \ldots + \theta_m X^m \tag{5}$$

Here, the order of input (X) is more than 1. The co-efficient of weight vector can be calculated from OLS principle.

In a second specific example, the medical device 10 can include a fixed display. These displays are having fixed resolution, size, and the outputs the images of specific intensity and contrast. Sometimes, these displays can be changed. Even though the external parameters (e.g., climatic parameter or room parameters) are the same, the medical device parameters have changed. Because of change in display resolution and size, it may produce images of different intensity (contrast) which may not be useful sometime.

Figure 8:
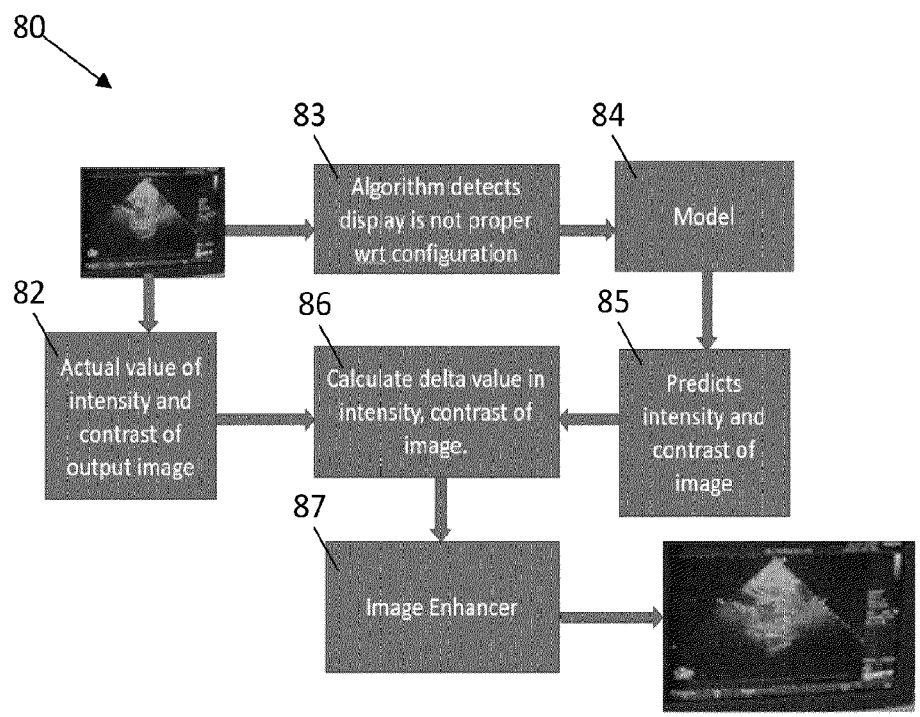

FIG. 8 shows an example of this process. At an operation 92, the environmental sensor(s) 14 can measure actual values of the intensity and contrast of the images. At an operation 93, the auto-correct device output module 80 is configured to detect that the display does not have a proper configuration. At an operation 94, a regression-based model is used to calculate the contrast and intensity of the images from the configuration of the medical device 10. At an operation 95, a predicted intensity and contrast values are generated. At an operation 96, Δ is calculated which is the difference of the actual values and the predicted values. At an operation 97, Δ is passed to image enhancer to change the device output by auto-correcting (i.e., auto-increment or auto-decrement) the configuration of the medical device 10.

The disclosure has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A medical device, comprising:
a medical component; at least one environmental sensor; an electronic processor; and
a non-transitory computer readable medium storing: device operational instructions executable by the electronic processor to control the medical component to perform a medical function respective to a medical subject, including:
retrieving an electronic manual for the medical device from a database;
performing natural language processing on the electronic manual to extract the operating specification for the medical device from the electronic manual; and storing the extracted operating specification on the non-transitory storage medium of the medical device;
and device monitoring instructions executable by the electronic processor to:
receive a measurement of at least one environmental parameter from the at least one environmental sensor; and
output an alert about the performance of the medical function respective to the medical subject if the measurement of the at least one environmental parameter is outside of the operating specification for the medical device.

2. The medical device of claim 1, wherein:
the performance of the medical function respective to the medical subject includes setting an operating parameter of the medical device based on a manual adjustment input received from a user of the medical device; and
the device monitoring instructions are executable by the electronic processor to modify the performance of the medical function respective to the medical subject if the measurement of the at least one environmental parameter is outside of the operating specification for the medical device including automatically adjusting the operating parameter of the medical device based on the measurement of the at least one environmental parameter.

3. The medical device of claim 1, wherein the device monitoring instructions are executable by the electronic processor to detect whether the measurement of the at least one environmental parameter is outside of the operating specification for the medical device by:
performing the detecting with a thresholding process.

4. The medical device of claim 1, wherein the device monitoring instructions are executable by the electronic processor to detect whether the measurement of the at least one environmental parameter is outside of the operating specification for the medical device by:
performing the detecting with a trained machine-learning (ML) component.

5. The medical device of claim 1, further comprising:
a display device; wherein:
the at least one medical component comprises a medical imaging component;
the at least one environmental sensor comprises at least one optical sensor;
the performance of the medical function respective to the medical subject comprises acquiring a medical image of the subject and presenting a rendering of the medical image on the display device; and
the device monitoring instructions are executable by the electronic processor to:
receive the measurement comprising an ambient light measurement from the at least one optical sensor; and
modify one or more rendering parameters of the presented rendering of the medical image on the display device if the ambient light measurement is outside of an ambient light specification of the operating specification for the medical device.

6. The medical device of claim 5, wherein the device monitoring instructions are executable by the electronic processor to modify the one or more rendering parameters of the presented rendering of the medical image on the display device by:
applying an artificial intelligence (AI) model to inputs including a standard rendering of the medical image and the ambient light measurement to determine the modified rendering parameters.

7. The medical device of claim 1, further comprising:
a loudspeaker; wherein:
the at least one medical component comprises a Doppler ultrasound measurement component;
the at least one environmental sensor comprises a microphone;
the performance of the medical function respective to the medical subject comprises acquiring blood flow measurements of the subject and presenting a sound indicative of the blood flow measurements using the loudspeaker; and
the device monitoring instructions are executable by the electronic processor to:
receive the measurement comprising an ambient sound measurement from the microphone; and
increase a volume of the presented sound indicative of the blood flow measurements if the ambient sound measurement exceeds a maximum ambient sound limit of the operating specification for the medical device.

8. The medical device of claim 1, wherein:
the at least one environmental sensor comprises a vibration sensor; and
the device monitoring instructions are executable by the electronic processor to:
receive the measurement comprising a vibration measurement from the vibration sensor; and
output the alert if the vibration measurement exceeds a maximum vibration limit of the operating specification for the medical device.

9. The medical device of claim 1, wherein:
the at least one environmental sensor comprises a hygrometer; and
the device monitoring instructions are executable by the electronic processor to:

receive the measurement comprising a humidity measurement from the hygrometer; and output the alert if the humidity measurement is outside of an operational humidity range of the operating specification for the medical device.

10. The medical device of claim 1, wherein:

the at least one environmental sensor comprises a thermometer; and the device monitoring instructions are executable by the electronic processor to:

receive the measurement comprising a temperature measurement from the thermometer; and output the alert if the temperature measurement is outside of an operational temperature range of the operating specification for the medical device.

11. The medical device of claim 1, wherein:

the at least one environmental sensor comprises a Geiger counter; and the device monitoring instructions are executable by the electronic processor to:

receive the measurement comprising an ionizing radiation counts measurement from the Geiger counter; and output the alert if the ionizing radiation counts measurement exceeds a maximum ionizing radiation counts limit of the operating specification for the medical device.

12. The medical device of claim 1, wherein:

the at least one environmental sensor comprises a gyroscope; and the device monitoring instructions are executable by the electronic processor to:

receive the measurement comprising a measurement of tilt of the medical device from the gyroscope; and output the alert if the measurement of tilt exceeds a device tilt limit of the operating specification for the medical device.

13. The medical device of claim 1, wherein:

the at least one medical component comprises a radiation detector;

the performance of the medical function respective to the medical subject comprises measuring ionizing radiation counts emitted by a radiopharmaceutical administered to the medical subject using the radiation detector;

the at least one environmental sensor comprises a Geiger counter; and the device monitoring instructions are executable by the electronic processor to:

receive the measurement comprising an ionizing radiation counts measurement from the Geiger counter; and output the alert if the ionizing radiation counts measurement exceeds a maximum ionizing radiation counts limit of the operating specification for the medical device.

14. The medical device of claim 1, wherein:

the at least one medical component comprises a medical imaging component;

the at least one environmental sensor comprises a display connector for connecting a display device with the medical device;

the device operational instructions are executable by the electronic processor to control the medical imaging component to acquire a medical image of the medical subject and to present a rendering of the medical image on the display device connected with the display connector; and the device monitoring instructions are executable by the electronic processor to:

receive the measurement comprising a measurement of display characteristics of the display device connected with the display connector; and automatically modify one or more rendering parameters of the rendering of the medical image on the display based on the display characteristics of the display device connected with the display connector.

15. A non-transitory computer readable medium storing instructions executable by at least one electronic processor to perform a method of monitoring, with at least one environmental sensor, a performance of a medical device, the method comprising:

retrieving an electronic manual for the medical device from a database;

performing natural language processing on the electronic manual to extract the operating specification for the medical device from the electronic manual;

and storing the extracted operating specification on the non-transitory storage medium of the medical device;

receiving a measurement of at least one environmental parameter from the at least one environmental sensor;

determining whether the measurement of the at least one environmental parameter is outside of the operating specification for the medical device; and outputting an alert about the performance of a medical function, respective to a medical subject, performed by a medical component of the medical device when the measurement of the at least one environmental parameter is outside of the operating specification for the medical device.

16. The non-transitory computer readable medium of claim 15, wherein the at least one environmental sensor comprises a plurality of environmental sensors; and the method further includes:

inputting measurements of a plurality of environmental parameters from the corresponding environment sensors with a trained ML component; and determining whether the measurements of the environmental parameters are outside of the operating specification for the medical device with the trained ML component.

17. The non-transitory computer readable medium of claim 16, wherein the ML component is trained with data collected from the medical device related to the operating parameters.

18. The non-transitory computer readable medium of claim 16, wherein the at least one environmental sensor comprises one or more of:

an optical sensor:

a microphone;

a vibration sensor;

a hygrometer;

a thermometer;

a Geiger counter;

a gyroscope;

an electromagnetic (EM) wave sensor; and a display connector for connecting a display device with the medical device.

19. The non-transitory computer readable medium of claim 15, wherein the method further includes:

modifying the performance of the medical function respective to the medical subject if the measurement of the at least one environmental parameter is outside of the operating specification for the medical device including automatically adjusting the operating parameter of the medical device based on the measurement of the at least one environmental parameter.

* * * * *